US012555954B2

(12) United States Patent
Chen et al.

(10) Patent No.: US 12,555,954 B2
(45) Date of Patent: Feb. 17, 2026

(54) TOOLLESS DIRECT CURRENT CONNECTOR WITH GROUND

(71) Applicant: DELL PRODUCTS L.P., Round Rock, TX (US)

(72) Inventors: Julian Yu-Hao Chen, Austin, TX (US); Padmanabh R. Gharpure, De Pere, WI (US)

(73) Assignee: Dell Products L.P., Round Rock, TX (US)

( * ) Notice: Subject to any disclaimer, the term of this patent is extended or adjusted under 35 U.S.C. 154(b) by 303 days.

(21) Appl. No.: 18/334,478

(22) Filed: Jun. 14, 2023

(65) Prior Publication Data

US 2024/0421535 A1 Dec. 19, 2024

(51) Int. Cl.
*H01R 13/627* (2006.01)
*H01R 105/00* (2006.01)

(52) U.S. Cl.
CPC ..... *H01R 13/6273* (2013.01); *H01R 2105/00* (2013.01)

(58) Field of Classification Search
CPC .............. H01R 13/6273; H01R 13/639; H01R 13/6271; H01R 13/6275; H01R 2105/00
USPC ........ 439/357, 347, 358, 353, 352, 106, 373
See application file for complete search history.

(56) References Cited

U.S. PATENT DOCUMENTS 4,634,211 A * 1/1987 Poliak .................... H01R 24/28 439/456
5,069,634 A * 12/1991 Chiarolanzio ..... H01R 13/6273 439/373
5,344,333 A * 9/1994 Haag .................... H01R 13/639 439/106
5,344,335 A * 9/1994 Scholz ................... H01R 13/28 439/357
6,319,040 B1 * 11/2001 Chang ................ H01R 13/6275 439/352
6,383,003 B1 * 5/2002 Corona .............. H01R 13/5219 439/588
7,517,234 B2 * 4/2009 Akino .................. H01R 13/512 439/106
7,789,714 B2 * 9/2010 Liu ........................ H01R 12/58 439/924.1
8,496,496 B2 * 7/2013 Yan .................... H01R 13/6275 439/353
8,512,069 B2 * 8/2013 Kao ..................... H01R 13/506 439/106
11,366,504 B2 * 6/2022 Bikumala ............... H02M 1/36
11,411,509 B2 * 8/2022 Yu ........................ G06F 11/3058
2005/0239305 A1 * 10/2005 Akino .................. H01R 13/652 439/106

(Continued)

*Primary Examiner* — Gary F Paumen
(74) *Attorney, Agent, or Firm* — Larson Newman, LLP

(57) ABSTRACT

A toolless direct current connector includes a frame, a plug, and a toolless component. The plug is in physical communication with the frame. The plug includes a power terminal, a return terminal, and a ground terminal. The plug to be secured within a receptacle of a power supply unit. The toolless component is in physical communication with the frame and with the plug. The toolless component transitions between a locked position and an unlocked position. The toolless component releases the plug from within the receptacle of the power supply unit when the toolless component transitions from the locked position to the unlocked position.

20 Claims, 6 Drawing Sheets

(56) References Cited

U.S. PATENT DOCUMENTS

| | | | | |
|---|---|---|---|---|
| 2006/0148300 | A1* | 7/2006 | Huang ............... | H01R 13/6275<br>439/353 |
| 2008/0200058 | A1* | 8/2008 | Tsai ................... | H01R 13/6275<br>439/353 |
| 2009/0258526 | A1* | 10/2009 | Chen .................. | H01R 13/6271<br>439/352 |
| 2010/0285684 | A1* | 11/2010 | Zhang ................ | H01R 13/6275<br>439/357 |
| 2020/0341528 | A1 | 10/2020 | Bikumala et al. | |
| 2022/0123664 | A1 | 4/2022 | Yu et al. | |

* cited by examiner

Atty. Dkt. No.: DC-132473
Inventors: Julian Chen et al.

REPLACEMENT SHEET

5/6

TOOLLESS DIRECT CURRENT CONNECTOR WITH GROUND

FIELD OF THE DISCLOSURE

The present disclosure generally relates to information handling systems, and more particularly relates to a toolless direct current connector with ground.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A toolless direct current connector includes a frame, a plug, and a toolless component. The plug may be in physical communication with the frame. The plug may include a power terminal, a return terminal, and a ground terminal. The plug may be secured within a receptacle of a power supply unit. The toolless component may be in physical communication with the frame and with the plug. The toolless component may transition between a locked position and an unlocked position. The toolless component may release the plug from within the receptacle of the power supply unit when the toolless component transitions from the locked position to the unlocked position.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
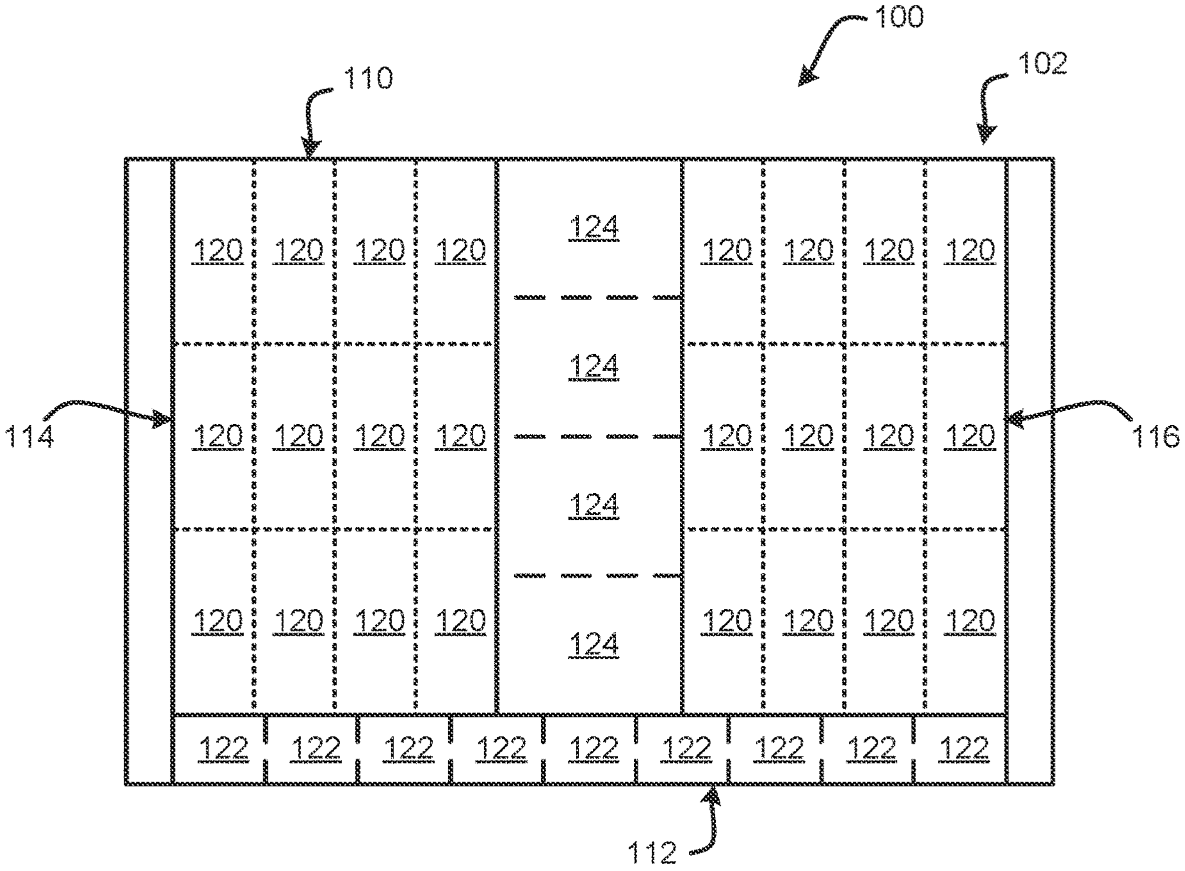
FIG. 1 is a block diagram of a front panel of an information handling system according to at least one embodiment of the present disclosure.

FIG. 1 illustrates an information handling system 100 according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), server (such as a blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Information handling system 100 includes a chassis 102, which in turn includes a top panel 110, a bottom panel 112, and side panels 114 and 116. The components and devices located within a front portion of chassis 100 include multiple compute devices 120, power supply units 122, and fans 124. In an embodiment, compute devices 120 can be peripheral devices, such as storage devices, peripheral component interconnect express (PCIe) devices, or the like. In an embodiment, compute devices 120 may utilize most of the space of the front of chassis 102 except where power supply units 122 extend horizontally across the bottom of the chassis adjacent to bottom panel 112, and fans 124 extend vertically down the center of the chassis from the top panel 110 to the top of power supply units 122.

Figure 2:
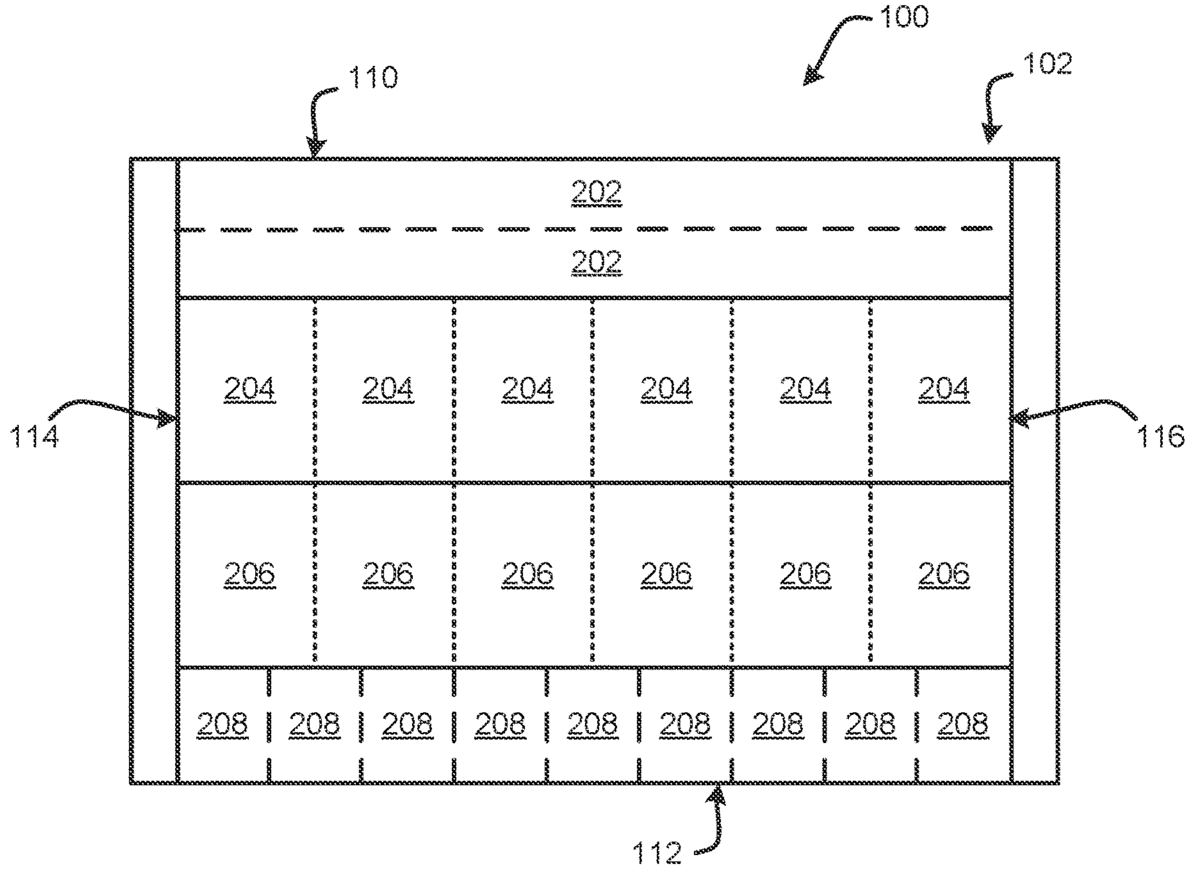
FIG. 2 is a block diagram of a rear panel of the information handling system according to at least one embodiment of the present disclosure.

Referring to FIG. 2, the components and devices located within the back of chassis 102 include multiple I/O devices 202, a first group of fans 204, and multiple other modules 206. In an embodiment, I/O devices 202 may be oriented horizontally across the top of back panel 116. Fans 124 can be located in a horizontal row below I/O devices 104 within back panel 116, and modules 206 may be located in a horizontal row below fans 124 within the back panel. In an embodiment, each power supply unit 122 includes a fan within the power supply unit itself. In this embodiment, back panel 116 may include exhaust ports 208 to expel air from fans of power supply units 122. In another embodiment, fans within power supply units 122 may be moved to exhaust ports 208 without varying from the scope of the disclosure. Information handling system 100 may include any suitable number of additional components or information handling systems without varying from the scope of this disclosure. In an example, each module 206 may be any suitable compute module including, but not limited to, a graphics processing unit (GPU) module and a processing module. Module 206 may include any suitable components including, but not limited to, the components of FIG. 9.

Figure 3:
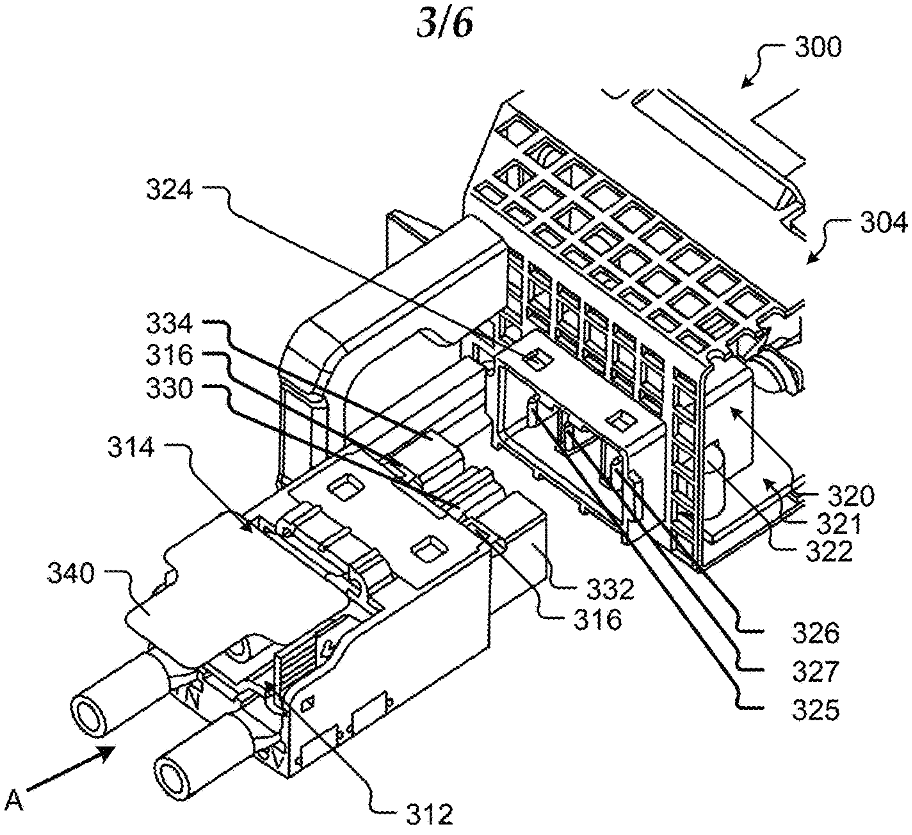
FIGS. 3 and 4 are perspective views of a toolless direct current power connector and a power supply receptacle, respectively, according to at least one embodiment of the present disclosure.
Figure 4:
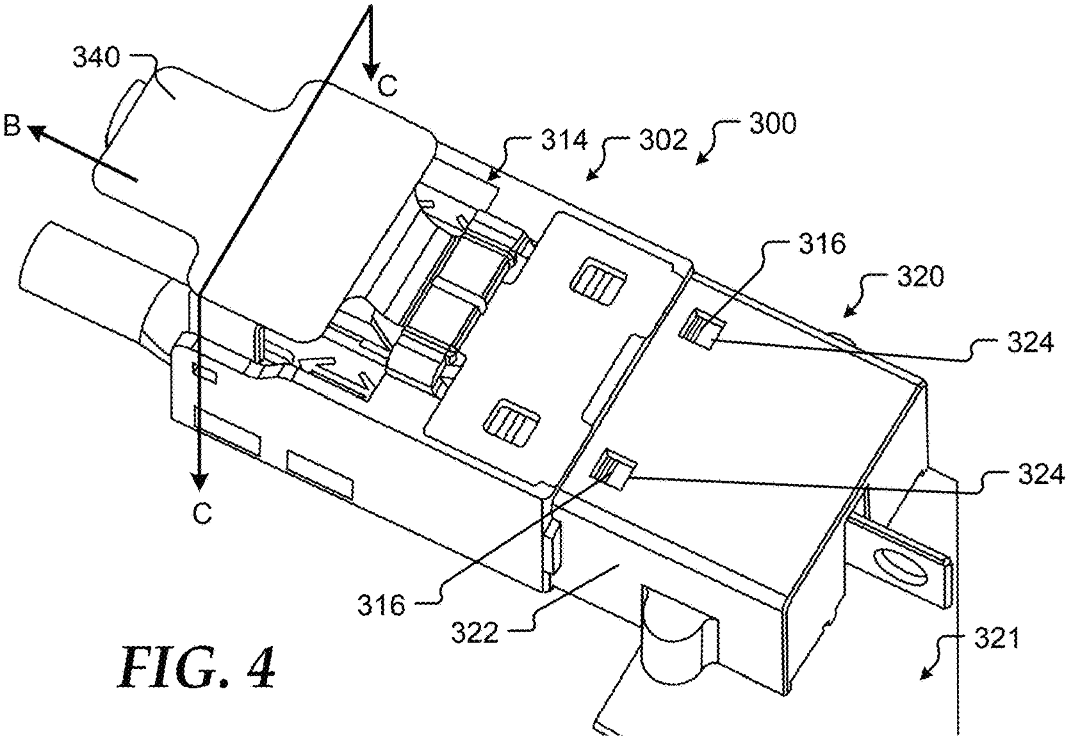

FIGS. 3 and 4 illustrate components of an information handling system 300 including a toolless direct current (DC) power connector 302 according to at least one embodiment of the present disclosure. Referring now to FIG. 3, information handling system 300 further includes a power supply 304. Toolless DC power connector 302 includes a plug 310, a removable sliding cover 312, a toolless component 314, latches 316, and a frame 318. Power supply unit 304 includes a power supply receptacle 320 and a control board 321. Power supply receptable 320 includes a frame 322, catches 324, a return pin 325, a power pin 326, and a ground pin 327. Plug 310 includes a ground terminal 330, a return terminal 332, and a power terminal 334. Toolless component 314 includes a tab 340. DC power connector 302 may include additional components without varying from the scope of this disclosure.

In an example, terminals 330, 332, and 334 within plug 310 may be electrically coupled to power cables as will be described below. In certain examples, plug 310 may be configured or built so that ground terminal 330 may connect with power supply receptacle 320 before return terminal 332 or power terminal 334. For example, electrical connections within ground terminal 330 may extend further from frame 318 as compared to electrical connections within both return terminal 332 and power terminal 334. Additionally or alternatively, ground pin 327 may extend further from frame 322 as compared to return pin 325 and power pin 326. In these examples, the electrical connection of ground terminal 330 may be the last connection disconnected from power supply receptacle 320, such as from ground pin 327, as toolless DC power connector 302 is removed from a power supply unit. Plug 310 may provide necessary safety features of ground terminal 330 being the first terminal connected to power supply receptacle 320 and the last terminal disconnected from the power supply receptacle.

In certain examples, toolless component 314 may be physically coupled to latches 316, such that the toolless component may control movement of the latches. In an example, latches 316 may be biased in a locked position, and a force exerted on the latches via toolless component 314 may cause the latches to transition from the locked position to an unlocked position. In response to a force being exerted on DC power connector 302 in the direction of arrow A, plug 310 may be inserted within frame 322 of power supply receptacle 320. As plug 310 is inserted within power supply receptacle 320, latches 316 may flex away from the locked position toward the unlocked position. When plug 310 is fully inserted within power supply receptacle 320, hook portions of latches 316 may snap fit within catches 324 of the power supply receptacle as shown in FIG. 4.

Referring now to FIG. 4, hook portions of latches 316 are located within catches 324 to securely hold DC power connector 302 in both physical and electrical communication with power supply receptacle 320. In this example, power from DC power connector 302 may be provided to control board 321 via power supply receptacle 320. In an example, an individual may exert a force on tab 340 of toolless component 314 in the direction of arrow B. Based on the force on tab 340, toolless component 314 may exert a substantially equal force on latches 316. In an example, the force exerted on latches 316 that may cause the latches to transition from the locked position to the unlocked position.

When latches 316 are in the unlocked position, DC power connector 302 may be removed from within frame 322 of power supply receptacle 320. For example, plug 310, illustrated in FIG. 3, may disconnect from electrical components within frame 322. As stated above, ground terminal 330, illustrated in FIG. 3, may be the last terminal of DC power connector 302 to be disconnected from corresponding terminals of power supply receptable 320. A cross section of DC power connector 302 along line C-C is illustrated in FIG. 5.

Figure 5:
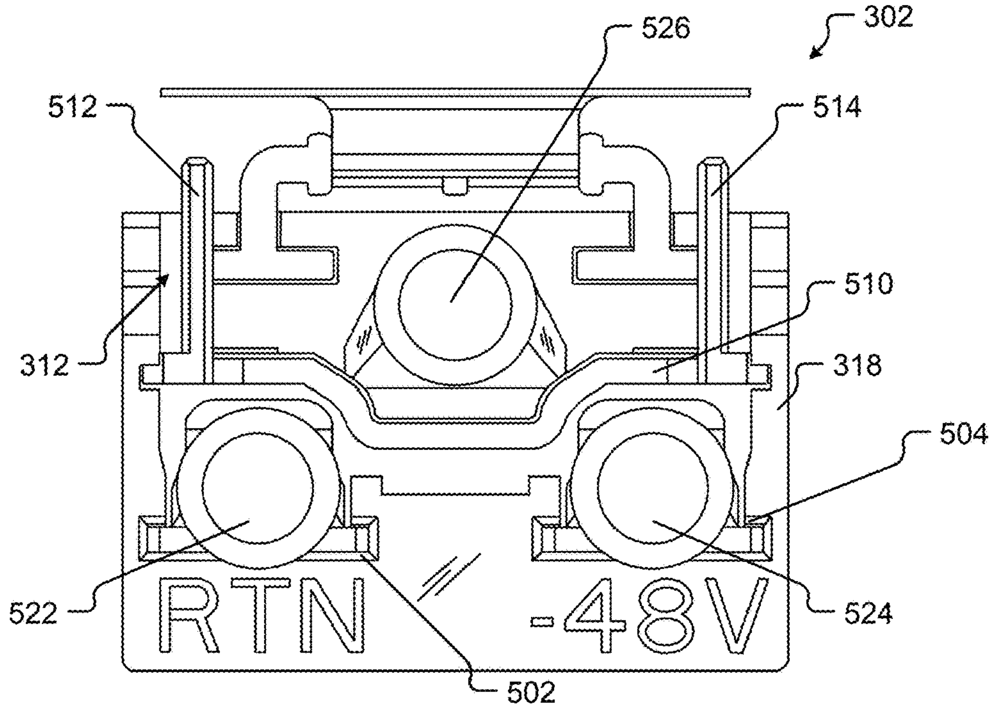
FIG. 5 is a cross-sectional view of a toolless direct current power connector according to at least one embodiment of the present disclosure.

FIG. 5 is a cross-sectional view of toolless DC power connector 302 according to at least one embodiment of the present disclosure. Toolless DC power connector 302 includes a return power connector 502, a power connector 504, and a ground connector 506. Removable sliding cover 312 includes a main portion 510 and tabs 512 and 514. In an example, return connector 502 may be placed in physical and electrical communication with a return wire 522, power connector 504 may be placed in physical and electrical communication with a power wire 524, and ground connector 506 may be placed in physical and electrical communication with a ground wire 526. For example, screws, such as screws 754 in FIG. 7, may be secure return wire 522 to return connector 502. Similarly, screws, such as screws 752 in FIG. 7, may be secure power wire 524 to return connector 504. A screw, such as screw 750 in FIG. 7, may be secure ground wire 526 to return connector 506.

In an example, removable sliding cover 312 may be inserted within notches of fame 318 which in turn may place the removable sliding cover between ground connector 506 and both of return connector 502 and power connector 504. In this example, removable sliding cover 312 may prevent an individual from touching the return connector 502 and/or power connector 504 while handling toolless DC power connector 302. In certain examples, removable sliding cover 312 may be inserted within frame 318 after return wire 522 is connected to return connector 502 and power wire 524 is connected to power connector 504. Removable sliding cover 312 may prevent electrocution of the individual that may result if the individual accidentally touches ground connector 506 and one of return or power connector 502 and 504 at the same time.

In certain examples, tabs 512 and 514 may be utilized by an individual to exert a force on removable sliding cover 312. For example, an individual may exert a force on tabs 512 and 514 to slide removable sliding cover 514 along notches of frame 318 until the removable sliding cover is fully inserted within the frame. In certain examples, main portion 510 may be any suitable shape to separate ground wire 526 from both return wire 522 and power wire 524. For example, main portion 510 may be substantially flat, may dipped below ground connector 506 and in between return connector 502 and power connector 504, as shown in FIG. 5, or the like.

Figure 6:
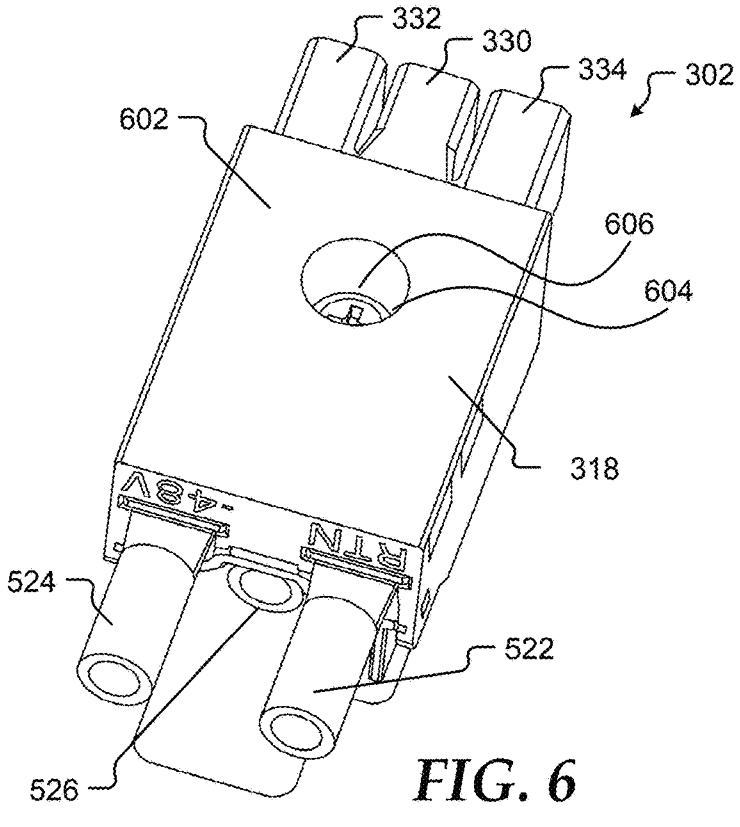
FIG. 6 is a perspective view of a bottom of a toolless direct current power connector according to at least one embodiment of the present disclosure.

FIG. 6 illustrates a bottom surface 602 of frame 318 of toolless DC power connector 302 according to at least one embodiment of the present disclosure. Frame 318 includes a bottom surface 602, which in turn includes an opening 604. In an example, a ground connector, such as ground connector 506, may be physically and electronically connected to ground terminal 330 via a connection component 606. In certain examples, connection component 606 may be any suitable component, such as a screw, that may be able to hold the ground connector in communication with the ground terminal 330.

Figure 7:
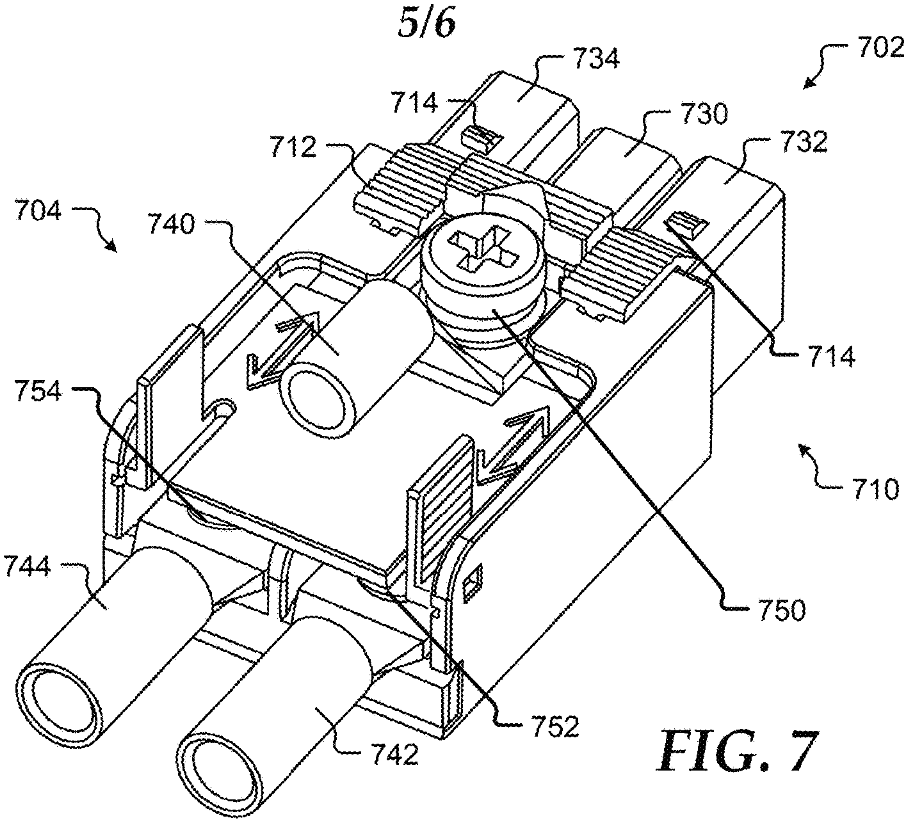
FIG. 7 is a perspective view of a toolless direct current power connector and a power supply unit according to at least one embodiment of the present disclosure.
Figure 8:
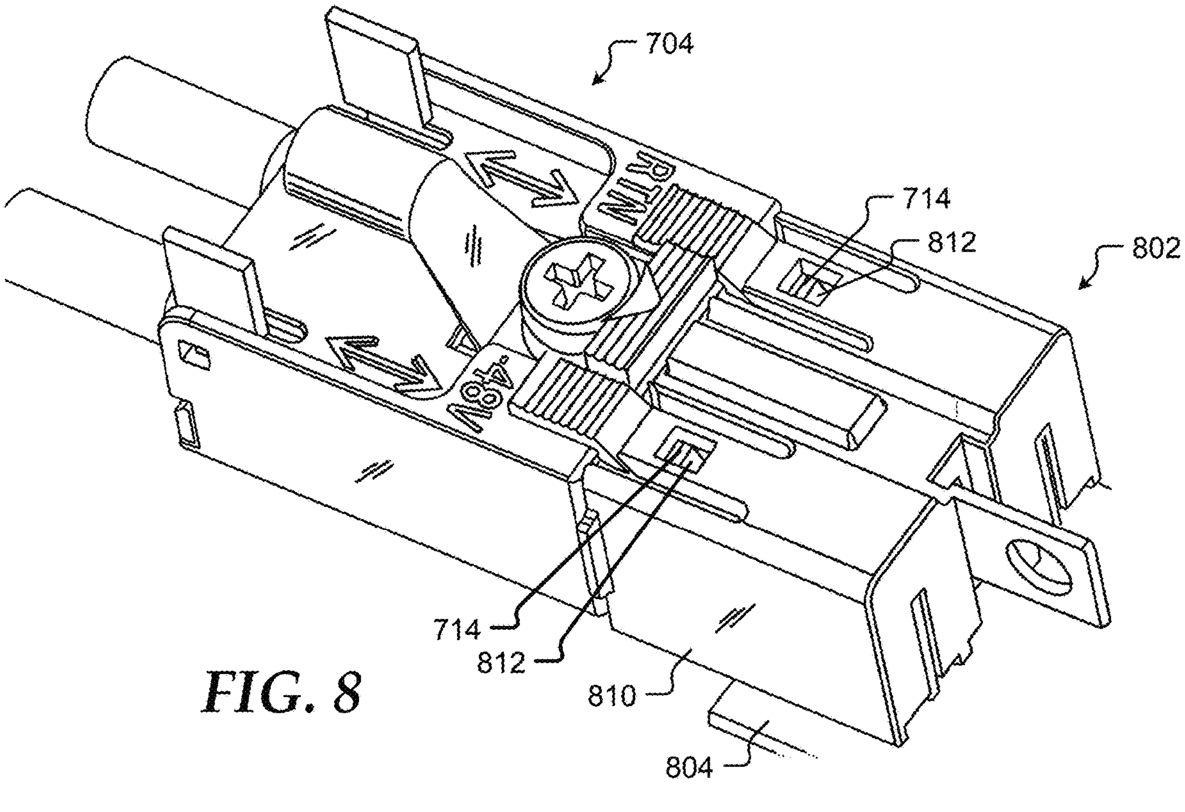
FIG. 8 is a perspective view of a toolless direct current power connector according to at least one embodiment of the present disclosure.

FIGS. 7 and 8 illustrate a toolless DC power connector 702 according to at least one embodiment of the present disclosure. Referring now to FIG. 7, toolless DC power connector 702 includes a plug 710, a toolless component 712, latches 714, and a frame 716. Referring now to FIG. 8, toolless DC power connector 702 may interface with a power supply receptacle 802, which in turn is in physical communication with a control board 804. Power supply receptable 802 includes a frame 810 and catches 812. Referring back to FIG. 7, plug 310 includes a ground terminal 730, a return terminal 732, and a power terminal 734. DC power connector 702 may include additional components without varying from the scope of this disclosure.

In an example, terminals 730, 732, and 734 within plug 710 may be electrically coupled to power cables as described above. In certain examples, plug 710 may be configured or built so that ground terminal 730 may connect with power supply receptacle 802 of FIG. 8 before return terminal 732 or power terminal 734. For example, electrical connections within ground terminal 730 may extend further from frame 716 as compared to electrical connections within both return terminal 732 and power terminal 734. In this example, the electrical connection of ground terminal 730 may be the last connection disconnected from power supply receptacle 802 as toolless DC power connector 702 is removed from a power supply unit. Plug 710 may provide necessary safety features of ground terminal 730 being the first terminal connected to power supply receptacle 802 and the last terminal disconnected from the power supply receptacle.

In certain examples, latches 714 may be physical connected to plug 710. As plug 710 is inserted within power supply receptacle 802, catches 812 may flex away from a locked position toward the unlocked position. When plug 710 is fully inserted within power supply receptacle 802, hook portions of latches 714 may snap fit within catches 812 of the power supply receptacle as shown in FIG. 8.

Referring now to FIG. 8, hook portions of latches 714 are located within catches 812 to securely hold DC power connector 702 in both physical and electrical communication with power supply receptacle 802. In this example, power from DC power connector 702 may be provided to control board 804 via power supply receptacle 802. In an example, an individual may exert a force on toolless component 712 in the direction of power supply receptacle 802. Based on the force on toolless component 712, the toolless component may exert a substantially equal force on catches 812. In an example, the force exerted on catches 812 that may cause the catches to transition from the locked position to an unlocked position.

When catches 812 are in the unlocked position, toolless DC power connector 702 may be removed from within frame 810 of power supply receptacle 802. For example, plug 710, illustrated in FIG. 7, may disconnect from electrical components within frame 810. As stated above, ground terminal 730, illustrated in FIG. 3, may be the last terminal of DC power connector 702 to be disconnected from corresponding terminals of power supply receptable 802.

Figure 9:
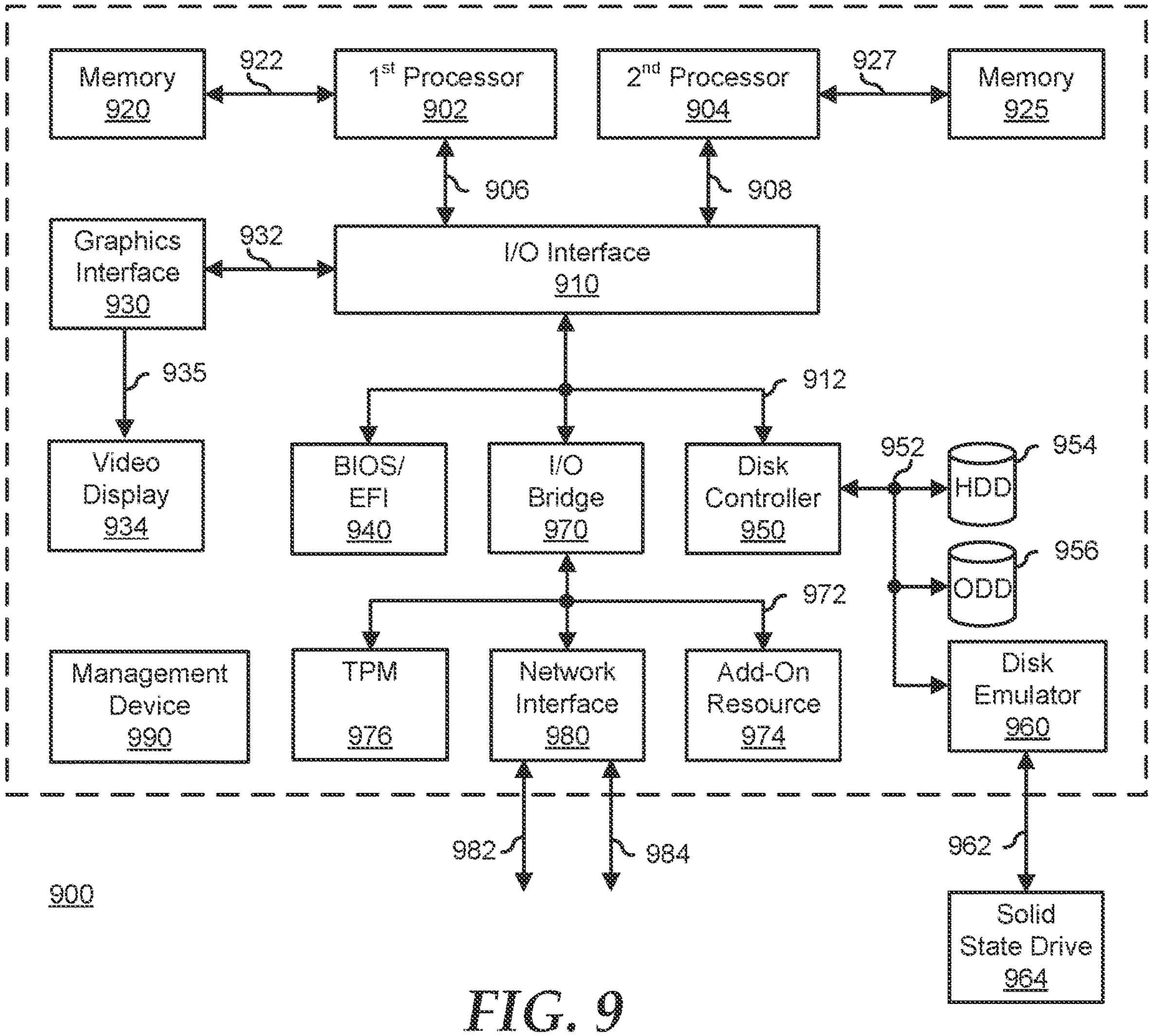
FIG. 9 is a block diagram of a general information handling system according to an embodiment of the present disclosure.

FIG. 9 shows a generalized embodiment of an information handling system 900 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 900 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 900 can include processing resources for executing machine-executable code, such as a central processing unit (CPU), a programmable logic array (PLA), an embedded device such as a System-on-a-Chip (SoC), or other control logic hardware. Information handling system 900 can also include one or more computer-readable medium for storing machine-executable code, such as software or data. Additional components of information handling system 900 can include one or more storage devices that can store machine-executable code, one or more communications ports for communicating with external devices, and various input and output (I/O) devices, such as a keyboard, a mouse, and a video display. Information handling system 900 can also include one or more buses operable to transmit information between the various hardware components.

Information handling system 900 can include devices or modules that embody one or more of the devices or modules described below and operates to perform one or more of the methods described below. Information handling system 900 includes a processors 902 and 904, an input/output (I/O) interface 910, memories 920 and 925, a graphics interface 930, a basic input and output system/universal extensible firmware interface (BIOS/UEFI) module 940, a disk controller 950, a hard disk drive (HDD) 954, an optical disk drive (ODD) 956, a disk emulator 960 connected to an external solid state drive (SSD) 962, an I/O bridge 970, one or more add-on resources 974, a trusted platform module (TPM) 976, a network interface 980, a management device 990, and a power supply 995. Processors 902 and 904, I/O interface 910, memory 920, graphics interface 930, BIOS/UEFI module 940, disk controller 950, HDD 954, ODD 956, disk emulator 960, SSD 962, I/O bridge 970, add-on resources 974, TPM 976, and network interface 980 operate together to provide a host environment of information handling system 900 that operates to provide the data processing functionality of the information handling system. The host environment operates to execute machine-executable code, including platform BIOS/UEFI code, device firmware, operating system code, applications, programs, and the like, to perform the data processing tasks associated with information handling system 900.

In the host environment, processor 902 is connected to I/O interface 910 via processor interface 906, and processor 904 is connected to the I/O interface via processor interface 908. Memory 920 is connected to processor 902 via a memory interface 922. Memory 925 is connected to processor 904 via a memory interface 927. Graphics interface 930 is connected to I/O interface 910 via a graphics interface 932 and provides a video display output 936 to a video display 934. In a particular embodiment, information handling system 900 includes separate memories that are dedicated to each of processors 902 and 904 via separate memory interfaces. An example of memories 920 and 930 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 940, disk controller 950, and I/O bridge 970 are connected to I/O interface 910 via an I/O channel 912. An example of I/O channel 912 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 910 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 940 includes BIOS/UEFI code operable to detect resources within information handling system 900, to provide drivers for the resources, initialize the resources, and access the resources. BIOS/UEFI module 940 includes code that operates to detect resources within information handling system 900, to provide drivers for the resources, to initialize the resources, and to access the resources.

Disk controller 950 includes a disk interface 952 that connects the disk controller to HDD 954, to ODD 956, and to disk emulator 960. An example of disk interface 952 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 960 permits SSD 964 to be connected to information handling system 900 via an external interface 962. An example of external interface 962 includes a USB interface, an IEEE 4394 (Firewire) interface, a proprietary interface, or a combination thereof. Alternatively, solid-state drive 964 can be disposed within information handling system 900.

I/O bridge 970 includes a peripheral interface 972 that connects the I/O bridge to add-on resource 974, to TPM 976, and to network interface 980. Peripheral interface 972 can be the same type of interface as I/O channel 912 or can be a different type of interface. As such, I/O bridge 970 extends the capacity of I/O channel 912 when peripheral interface 972 and the I/O channel are of the same type, and the I/O bridge translates information from a format suitable to the I/O channel to a format suitable to the peripheral channel 972 when they are of a different type. Add-on resource 974 can include a data storage system, an additional graphics interface, a network interface card (NIC), a sound/video processing card, another add-on resource, or a combination thereof. Add-on resource 974 can be on a main circuit board, on separate circuit board or add-in card disposed within information handling system 900, a device that is external to the information handling system, or a combination thereof.

Network interface 980 represents a NIC disposed within information handling system 900, on a main circuit board of the information handling system, integrated onto another component such as I/O interface 910, in another suitable location, or a combination thereof. Network interface device 980 includes network channels 982 and 984 that provide interfaces to devices that are external to information handling system 900. In a particular embodiment, network channels 982 and 984 are of a different type than peripheral channel 972 and network interface 980 translates information from a format suitable to the peripheral channel to a format suitable to external devices. An example of network channels 982 and 984 includes InfiniBand channels, Fibre Channel channels, Gigabit Ethernet channels, proprietary channel architectures, or a combination thereof. Network channels 982 and 984 can be connected to external network resources (not illustrated). The network resource can include another information handling system, a data storage system, another network, a grid management system, another suitable resource, or a combination thereof.

Management device 990 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 900. In particular, management device 990 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 900, such as system cooling fans and power supplies. Management device 990 can include a network connection to an external management system, and the management device can communicate with the management system to report status information for information handling system 900, to receive BIOS/UEFI or system firmware updates, or to perform other task for managing and controlling the operation of information handling system 900.

Management device 990 can operate off of a separate power plane from the components of the host environment so that the management device receives power to manage information handling system 900 when the information handling system is otherwise shut down. An example of management device 990 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 990 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A toolless direct current connector comprising:

a frame;

a plug in physical communication with the frame, the plug including a power terminal, a return terminal, and a ground terminal, the plug to be secured within a receptacle of a power supply unit; and a toolless component in physical communication with the frame and with the plug, the toolless component includes latches near the plug, the toolless component to transition between a locked position and an unlocked position, wherein the toolless component to release the plug from within the receptacle of the power supply unit when the toolless component transitions from the locked position to the unlocked position, wherein the latches are pulled away from the receptacle when the toolless component transitions from the locked position to the unlocked position.

2. The toolless direct current connector of claim 1, wherein the ground terminal is positioned within the plug to contact the receptacle of the power supply unit before the power and return terminals.

3. The toolless direct current connector of claim 1, wherein the toolless component is biased toward the locked position.

4. The toolless direct current connector of claim 1, further comprising: a ground wire connector in physical communication with an outside surface of the frame, the ground wire connector to provide an electrical connection between a ground wire and the ground terminal.

5. The toolless direct current connector of claim 4, further comprising: a screw to provide the electrical connection between the ground wire and the ground terminal.

6. The toolless direct current connector of claim 1, further comprising: a power wire connector in physical communication with inside surface of the frame, the power wire connector to provide an electrical connection between a power wire and the power terminal.

7. The toolless direct current connector of claim 1, further comprising: a return wire connector in physical communication with an inside surface of the frame, the return wire connector to provide an electrical connection between a return wire and the ground terminal.

8. The toolless direct current connector of claim 1, further comprising: a removable sliding cover in physical communication with the frame, the removable sliding cover to cover a power wire connector and a return wire connector within the frame when the removable sliding cover is in a closed position.

9. An information handling system comprising:

a power supply unit including:

a control board; and receptacle; and a toolless direct current connector including:

a frame;

a plug in physical communication with the frame, the plug including a power terminal, a return terminal, and a ground terminal, the plug to be secured within a receptacle of a power supply unit; and a toolless component in physical communication with the frame and with the plug, the toolless component includes latches near the plug, the toolless component to transition between a locked position and an unlocked position, wherein the toolless component to release the plug from within the receptacle of the power supply unit when the toolless component transitions from the locked position to the unlocked position, wherein the latches are pulled away from the receptacle when the toolless component transitions from the locked position to the unlocked position.

10. The information handling system of claim 9, wherein the ground terminal is positioned within the plug to contact the receptacle of the power supply unit before the power and return terminals.

11. The information handling system of claim 9, wherein the toolless component is biased toward the locked position.

12. The information handling system of claim 9, wherein the toolless direct current connector further comprises: a ground wire connector in physical communication with an outside surface of the frame, the ground wire connector to provide an electrical connection between a ground wire and the ground terminal.

13. The information handling system of claim 12, wherein the toolless direct current connector further comprises: a screw to provide the electrical connection between the ground wire and the ground terminal.

14. The information handling system of claim 9, wherein the toolless direct current connector further comprises: a power wire connector in physical communication with inside surface of the frame, the power wire connector to provide an electrical connection between a power wire and the power terminal.

15. The information handling system of claim 9, wherein the toolless direct current connector further comprises: a return wire connector in physical communication with an inside surface of the frame, the return wire connector to provide an electrical connection between a return wire and the ground terminal.

16. The information handling system of claim 9, wherein the toolless direct current connector further comprises: a removable sliding cover in physical communication with the frame, the removable sliding cover to cover a power wire connector and a return wire connector within the frame when the removable sliding cover is in a closed position.

17. A toolless direct current connector comprising:

a frame;

a plug in physical communication with the frame, the plug including a power terminal, a return terminal, and a ground terminal, the plug to be secured within a receptacle of a power supply unit;

a toolless component in physical communication with the frame and with the plug, the toolless component includes latches near the plug, the toolless component to transition between a locked position and an unlocked position, wherein the toolless component releases the plug from within the receptacle of the power supply unit when the toolless component transitions from the locked position to the unlocked position, wherein the latches are pulled away from the receptacle when the toolless component transitions from the locked position to the unlocked position;

a ground wire connector in physical communication with an outside surface of the frame, the ground wire connector to provide an electrical connection between a ground wire and the ground terminal;

a power wire connector in physical communication with inside surface of the frame, the power wire connector to provide an electrical connection between a power wire and the power terminal; and a return wire connector in physical communication with an inside surface of the frame, the return wire connector to provide an electrical connection between a return wire and the ground terminal.

18. The toolless direct current connector of claim 17, wherein the ground terminal is positioned within the plug to contact the receptacle of the power supply unit before the power and return terminals.

19. The toolless direct current connector of claim 17, wherein the toolless component is biased toward the locked position.

20. The toolless direct current connector of claim 17, further comprising: a removable sliding cover in physical communication with the frame, the removable sliding cover to cover a power wire connector and a return wire connector within the frame when the removable sliding cover is in a closed position.

* * * * *